(12) United States Patent
Charles et al.

(10) Patent No.: US 8,782,412 B2
(45) Date of Patent: Jul. 15, 2014

(54) SECURED PRIVILEGED ACCESS TO AN EMBEDDED CLIENT ON A MOBILE DEVICE

(75) Inventors: Calvin Charles, Piscataway, NJ (US); Deepak Gonsalves, Bridgewater, NJ (US); Ramesh Parmar, Scotch Plains, NJ (US); Byung Joon Oh, Pisscataway, NJ (US); Subramanyam Ayyalasomayajula, Kendall Park, NJ (US)

(73) Assignee: AstherPal Inc., South Plainfield, NJ (US)

( * ) Notice: Subject to any disclaimer, the term of this patent is extended or adjusted under 35 U.S.C. 154(b) by 196 days.

(21) Appl. No.: 13/599,749

(22) Filed: Aug. 30, 2012

(65) Prior Publication Data

US 2013/0054969 A1 Feb. 28, 2013

Related U.S. Application Data

(60) Provisional application No. 61/529,723, filed on Aug. 31, 2011.

(51) Int. Cl.
*H04L 29/06* (2006.01)

(52) U.S. Cl.
USPC .......................................... 713/168; 713/169

(58) Field of Classification Search
USPC ................................................ 713/168, 169
See application file for complete search history.

(56) References Cited

U.S. PATENT DOCUMENTS

| | | | |
|---|---|---|---|
| 6,023,765 A * | 2/2000 | Kuhn | 726/4 |
| 6,161,139 A * | 12/2000 | Win et al. | 709/225 |
| 6,182,142 B1 * | 1/2001 | Win et al. | 709/229 |
| 6,832,373 B2 | 12/2004 | O'Neill | |
| 7,805,719 B2 | 9/2010 | O'Neill | |
| 2002/0169981 A1 * | 11/2002 | Sanchez, II | 713/201 |
| 2002/0174256 A1 * | 11/2002 | Bonilla et al. | 709/310 |
| 2003/0018644 A1 * | 1/2003 | Bala et al. | 707/100 |
| 2003/0065738 A1 | 4/2003 | Yang et al. | |

(Continued)

FOREIGN PATENT DOCUMENTS

| | | |
|---|---|---|
| EP | 1429569 | 6/2004 |
| WO | WO2005001665 | 1/2005 |

OTHER PUBLICATIONS

Joseph Bonneau, The Quest to Replace Passwords: A framework for Comparative Evaluation of Web Authentication Schemes, IEEE, 2012 pp. 553-567.*

(Continued)

*Primary Examiner* — Luu Pham
*Assistant Examiner* — Brian Olion
(74) *Attorney, Agent, or Firm* — Volpe and Koenig, P.C.

(57) ABSTRACT

Disclosed is an apparatus and method to access privileges of Virtual Mobile Management (VMM) client in mobile device. A disclosed example method contains an assigning embedded stub to raise the access privilege of the tool on a mobile device, the embedded stub is integrated by an operating system of the mobile device with "root" privilege, determining via a secured key exchange algorithm that the VMM client and tools is authorized to be installed on the mobile device then, the VMM client and tools of a mobile device are authorized to access a network interface of the Communication Endpoint Gateway (CEG) server, configuring the embedded stub to install the key exchange procedure for the shared certification between the embedded stub, VMM client and the session mediation server, enabling the embedded stub to communicate through a secure link via VMM client.

16 Claims, 4 Drawing Sheets

Communication End-Point Gateway (CEG) Server (Session Mediation Server)

Virtual Mobile Management Client with Embedded Stub

(56) References Cited

U.S. PATENT DOCUMENTS

| | | |
|---|---|---|
| 2003/0066065 A1 | 4/2003 | Larkin |
| 2003/0101246 A1 | 5/2003 | Lahti |
| 2003/0204726 A1 | 10/2003 | Kefford et al. |
| 2004/0098715 A1 | 5/2004 | Aghera et al. |
| 2005/0193098 A1 | 9/2005 | Khandpur et al. |
| 2006/0015404 A1 | 1/2006 | Tran |
| 2006/0015626 A1 | 1/2006 | Hallamaa et al. |
| 2006/0075284 A1 | 4/2006 | Skan |
| 2006/0130046 A1 | 6/2006 | O'Neill |
| 2006/0136922 A1 | 6/2006 | Zimberg et al. |
| 2006/0248522 A1 | 11/2006 | Lakshminarayanan et al. |
| 2007/0005647 A1 | 1/2007 | Cugi et al. |
| 2007/0106564 A1 | 5/2007 | Matotek et al. |
| 2007/0299940 A1 | 12/2007 | Gbadegesin et al. |
| 2007/0300287 A1* | 12/2007 | Wynne et al. ............... 726/2 |
| 2008/0098380 A1 | 4/2008 | Klusmeyer |
| 2008/0172736 A1 | 7/2008 | Barr et al. |
| 2008/0209193 A1 | 8/2008 | Zhang et al. |
| 2009/0164602 A1 | 6/2009 | Kies et al. |
| 2009/0177882 A1 | 7/2009 | Saran et al. |
| 2009/0221307 A1 | 9/2009 | Wolak et al. |
| 2009/0228966 A1 | 9/2009 | Parfene et al. |
| 2010/0070649 A1 | 3/2010 | Ng |
| 2010/0151823 A1 | 6/2010 | Dagorn et al. |
| 2010/0217780 A1 | 8/2010 | Erola et al. |
| 2011/0225417 A1* | 9/2011 | Maharajh et al. ............. 713/150 |
| 2013/0067542 A1* | 3/2013 | Gonsalves et al. ................ 726/4 |
| 2013/0086624 A1* | 4/2013 | Powell et al. ..................... 726/1 |

OTHER PUBLICATIONS

Boris Lavva, Object Management for Network-Centric Systems with Mobile Objects, 1997, IEEE, pp. 186-195.*

Anonymous, "SyncML notification initiated session", Internet Citation, XP002462105, URL:http://www.openmobilealliance.org/tech/affiliates/syncml/syncml_dm_notification_v11_20020215.pdf, (Dec. 12, 2007).

Kovacs, E. et al, "Integrating mobile agents into the mobile middleware", Internet article: http://download.springer.com/static/pdf/630/art%253A10.1007%252FBF01324936.pdf?auth66=1353975026_642152af85f26d0903f4dc786bdf1416&ext=.pdf>, p. 68-74, (Retrieved from Internet Nov. 26, 2012).

Caporuscio, M. et al, "Design and evaluation of a support service for mobile, wireless publish subscribe applications", 2003 IEEE, Internet article: http:ieeexplore.ieee.org/stamp/stamp.jsp?tp=&arnumber=1265521>, 29:12, p. 1059-1071, (Retrieved from Internet Nov. 26, 2012).

* cited by examiner

SECURED PRIVILEGED ACCESS TO AN EMBEDDED CLIENT ON A MOBILE DEVICE

CROSS-REFERENCE TO RELATED APPLICATION

This application is related to U.S. patent application Ser. No. 12/550,742 filed on Aug. 31, 2009. In addition, this application claims the priority date of U.S. Provisional Patent Application No. 61/529,723, filed Aug. 31, 2011, entitled "Secured Privileged Access on a Mobile Device", the contents of the applications are incorporated herein by reference.

FIELD OF THE INVENTION

The present invention relates to a method of invoking secured privilege access on a mobile phone and more particularly to methods to access privileges of Virtual Mobile Management (VMM) client in mobile device.

BACKGROUND OF THE INVENTION

Operating system of Mobile devices run on Mobile OS's kernel such as Linux, Darwin, Window CE, etc. and hence uses the Mobile OS' security policies. For accessing certain API's (Application Programming Interface) requires "root" privileges which can be accessed by the super user "su" (root) context. Applications with "root" privilege are restricted in devices due to security threats. To enable only a particular application to run under "root" but without "super user" (root) privilege will avoid the risk of giving temporary super user access and giving way for any other harmful application to run with the "root" privileges.

Most Mobile OS allows running an application as "root" while the current user is not the "super user". This is achieved by setting the SUID (Set User ID) file permission bit of an application. But before installing and accessing the application, we need a Key Exchange procedure.

With the growth of malicious applications or other fraudulent code (e.g., malware) targeted towards mobile devices, security of Mobile device is becoming progressively important. To connect to more than one type of wireless network (4G/3G/Wi-Fi), many mobile devices also include functionality in the mobile devices. For instance, a mobile device consists of a cellular wireless network (4G/3G) and a Wi-Fi wireless network. In this example, some applications on the mobile device (e.g., videoconference, Global Positioning System (GPS) applications, and virtual mobile management) may attach to the cellular network while other applications (e.g., web browsing, Short Message Service (SMS), multimedia streaming) may link to the Wi-Fi network. In some examples, without a user knowing which wireless network the applications are employing, the applications on a mobile device may access a wireless network.

These days, application software has become more complex. Application software that functions on this hardware becomes both more multifaceted and more diverse as computer hardware becomes more dominant, less costly, and more ubiquitous in electronic devices. Nevertheless, to adapt to new environments and provide additional functionality unlike hardware, software mechanisms tend to progress rapidly. This results in a condition in which installed software applications involve, or at least advantage from, continued monitoring and maintenance by skilled software experts familiar with the structure and instruments that make up the software. Even though the issue is more obvious in complex software applications such as security software, anti-virus software, and etc., for relatively simple applications that must increase or alter behavior to remain competitive, it still remains a substantial problem.

Furthermore, software reliability is becoming more significant. The cost of software downtime and poor performance has become more important as people count on software functionality for more business and personal activities. Both in terms of lost money and time, these costs are recognized.

By a business or other software user through the life cycle of a software application, the field of "software application management" includes a large number of activities. Presently, a business need is acknowledged and a software application that can fulfill that requirement is sought out. The business user normally purchases not only the application, but also associated services necessary to maintain the application such as remote control.

During an initial ineffective stage of application deployment, the business normally navigates the "learning curve" while users become familiar with the structures and restrictions of the application. The product is already close to the end of its life cycle and partial or wholesale upgrades must be considered, after the business often enters a phase where the application can be used professionally. For complex applications, the users may never entirely negotiate the learning curve. Therefore, a need occurs for more efficient placement of application software.

SUMMARY OF THE INVENTION

Disclosed is an apparatus and method to access privileges of Virtual Mobile Management (VMM) client in mobile device. A disclosed example method contains an assigning embedded stub to raise the access privilege of the tool on a mobile device, the embedded stub is integrated by an operating system of the mobile device with "root" privilege, determining via a secured key exchange algorithm that the VMM client and tools is authorized to be installed on the mobile device then, the VMM client and tools of a mobile device are authorized to access a network interface of the Communication Endpoint Gateway (CEG) server, configuring the embedded stub to install the key exchange procedure for the shared certification between the embedded stub, VMM client and the session mediation server, enabling the embedded stub to communicate through a secure link via VMM client.

The embedded stub of mobile device with "root" privilege is already established by the device vendor. To install the VMM client and tools on the mobile device is triggered by the embedded stub. To make the connection between VMM client and communication endpoint gateway server, the embedded stub then upraises the access level of the tool stub. After set-up a Key Exchange procedure for mutual confirmation, when the stub obtains the connection request from the communication endpoint gateway server for the first try are happened between the stub, VMM client and the communication endpoint gateway server. Through a safe link via VMM client, the connection endpoint gateway server and the embedded stub interconnect.

An objective of this invention is to deliver an improved method and apparatus for access privileges of VMM client.

Another objective of this invention is to propose a confidently method and apparatus for a secured key exchange algorithm between the embedded stub and communication endpoint gateway server (in other words, session mediation server).

Still another objective of this invention is to support a method and apparatus for enabling VMM client to communicate with session mediation server through a secure link via embedded stub.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
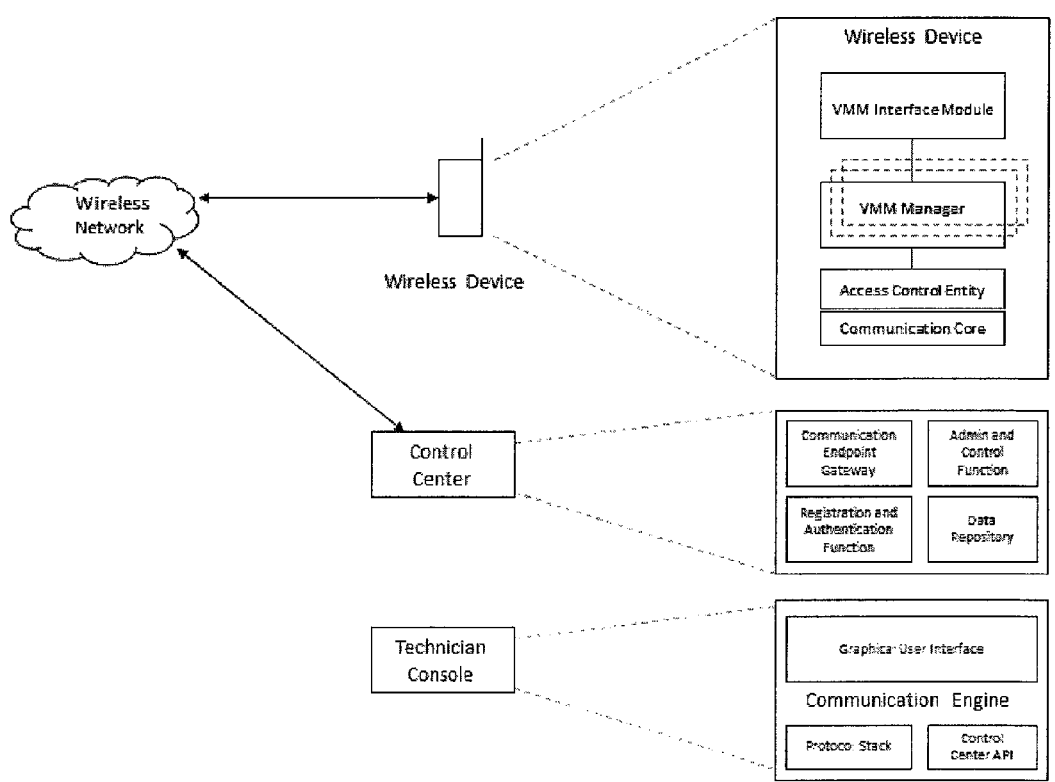
FIG. 1 is a pictorial overview of the system architecture.

Application management is that the people operated to achieve the application's placement are less familiar with the application's functions, features and behavior than are the people who produced the application is a common problem. For those charged with performing it, this leads to make the application management task complicated. To tackle with the application deployment process, business is often enforced to work or contract with Information Technology (IT) professionals.

Generally, a key to the encounters of application management is limited by the application service provider model and keeps to place a substantial portion of the application management problem on the customer or IT staff engineer.

So as to provide applications services from external application services providers such as remote access control, it is appropriate to install and update software application code. To be maintained and managed by the external provider with minimal impact on the user of the application services, this enables the application services to access remotely. However, in order to change the functions formerly completed by IT specialists or the users themselves, providing such application services usually involves access to privileged processes on the user's computer or smart phone.

A software application performs within the context of a "process/thread" in many computer systems. Along with some amount of resources such as virtual memory address space, a process is the active entity associated with a running program and holds one or more threads of implementation. To differentiate between the processes, which is an embodiment of running program, and the program itself is common. By containing a stored representation of the instructions that determine the computer's execution, the program refers to the files system object.

Known as credentials or privileges, which replicate their capability to accomplish various specialized operations, processes have certain features. The privileges assigned to the entity on whose behalf the process which was initiated which reflected by the credentials. The entity may be an object, or may be another software program that has permission to employ the processes. Privileges are allocated by a system administrator who firstly is given administrator rights, which enables the administrator to allocate rights to other objects.

Based upon their work requirements, level of trust by the computer system administrator, objects are allocated different capabilities or privileges. To implement various operations that might otherwise be prohibited by the operating system, trusted units are given privileges that allow "privileged processes" running on their behalf. A variety of name such as "user-level" to entitle a most restrictive privilege set and "admin-level to entitle a least restrictive privilege set are given by Privilege levels.

Most operating system (OS) software is cautiously protected by Access to privileged processes. Unsuitable usage of privileged processes can be stopped and/or destroyed by Computer systems. For instance, the installation process needs operation of registry objects in a Windows environment. Addition, deletion, and modification of registry entities can employ the computer unable to boot up the operating system. Most privilege mode procedures deliver prudently limited behavior that is readily checked by system protections for these reasons. Various software installation systems such as InstallShield, Wise Installation System, and Microsoft Setup Toolkit are available on the mobile device. A rule-based installation engine employing on the client machine is normally executed by these systems. In a rule-based instruction file that accompanies the software to be installed, the rule-based engine executes a set of rules that are presented. To handle registry entries, the installation engine has appropriate privileges. A user who also requires adequate privileges invokes the installation engine. The user constantly monitors the development of the installation process and can prevent undesired modifications to registry entities. The user Solicitation and monitoring of access to privileged progressions must be removed or reduced to allow remote control provision of application services (e.g., automated installed program such as virtual mobile management client and tools on the mobile device).

For instance, to update application code including access to a registry item, it would be appropriate to allow a script running in a web browser, which has only user-level privileges. From execution such an operation, the operating systems avoid user-level entities. To deliver a "generic" interface with less preventive access to privileged procedures is a possible clue. This would be similar to giving the general-purpose web browser admin-level privileges. As the operating system could be freely penetrated by unauthorized objects, viruses, and programs with bugs, such a system would be extremely elastic, but very unconfident.

From having a wide, readily extensible set of privileged procedures that can be performed, the remote control provision of application services also aids. A generic agent existing on a client system needs to admit any part of a registry file to generate, adjust and remove entries, contrarily conservative rule-based installation programs. Without revealing the client system to deliberate or unintentional security dangers, a necessity exists for systems and methods to offer generic, eagerly extensible apparatuses that are able to access privileged procedures.

FIG. 1 describes a schematic diagram illustration of overall system architecture about data flowconnections from a mobile device via the communication endpoint gateway (session mediation server) and Admin and Control server as the control center as well as TechnicianConsole.

Figure 2:
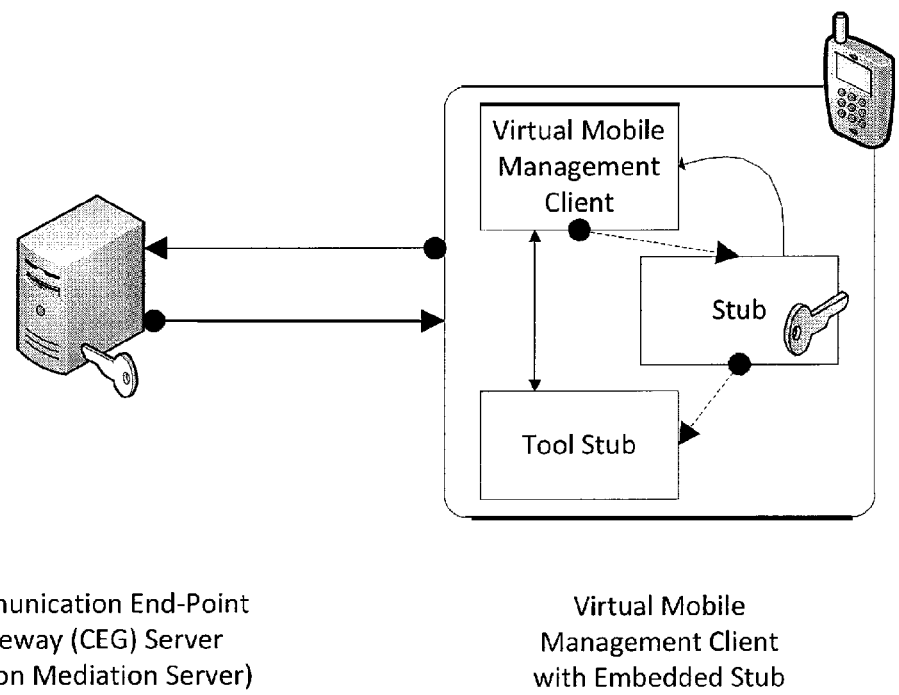
FIG. 2 is a pictorial depicting communication between a mobile client and CEGServer.

FIG. 2 demonstrates the communication link between mobile device and communication endpoint gateway server which system composes the CEG server and a mobile device with the embedded client stub including VMM client. Therefore, the system consists of the Session Mediation Server and the Mobile Device with the embedded client stub with "root"

privileges. The Session Mediation Server is responsible to make connections with the Virtual Mobile Management (VMM) client. As a result, VMM client get the access privileges via embedded stub after processing key exchange method in the detail following.

Virtual Mobile Management client for devices consists of different tools for performing device remote control, system diagnostics, health monitoring, etc. These tools can be remotely installed OTA (Over-The-Air). Few of these tools require root privilege to access certain system API. The embedded client is a stub that elevates the access privilege of the tool to access some system level API on the devices to perform remote virtual mobile management. The embedded stub is integrated with the OS with "root" as the owner with the SUID bit set.

Any application which invokes the embedded stub to request for executing an application with the elevated privilege has to undergo secure handshake through Session Mediation Server.

The Mediation server establishes secure connection with the mobile device. The Server and the client initiate a connection through a secured key exchange algorithm.

The Remote Diagnostic service on the Mobile Device is accomplished with three key components which include RD Mobile Application as virtual mobile management client, RD Mobile Enabler and RD Adapter as embedded stub. The RD Adapter and RD Mobile Enabler are System Level Application while the RD Application resides at the Application layer as shown FIG. 3.

The Mobile Client of this invention depending on the Mobile Device OS is comprised of: Remote Diagnostic Adapter also referred to as embedded stub AND Remote Diagnostics Mobile Application also referred to as Mobile Application (virtual mobile management client).

Figure 3:
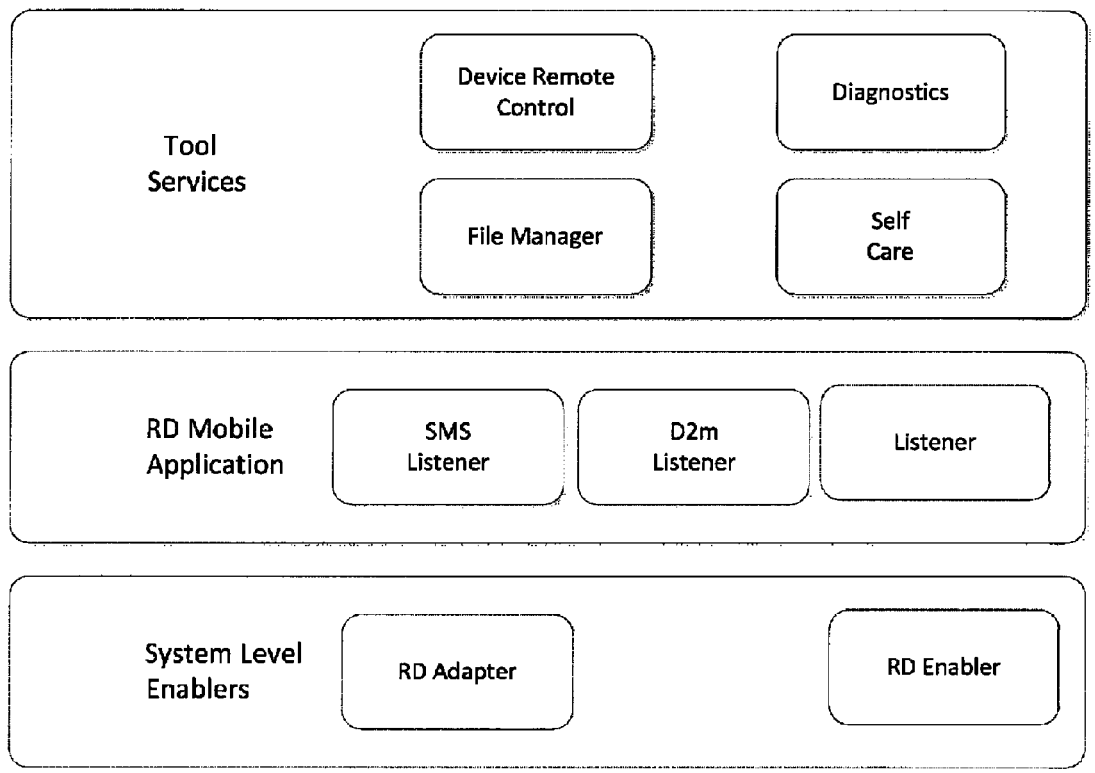
FIG. 3 is a flow chart of a detailed mobile client structure.

FIG. 3 demonstrates three main components such as Tool services, RD Mobile Application, and System Level Enablers in mobile client architecture in detail:

The RD Mobile Application provides Core Tool services, to manage the remote control session, collect the desired device diagnostics, provide self-care support for remote session activation and manage security protocol. The key features that are required by RD Mobile application to manage devices remotely include:
1. Display Capture: This method involves the capturing of device screen by the RD Mobile application.
2. Key event Injection: This method involves the injection of key events into the device screen by the RD Mobile application.
3. Touch event injection: This method involves the simulation of touch events on the device screen by the RD Mobile application.
4. Device Information: Getting the device information like network, power status, Mobile Network Code (MNC), Mobile Country Code (MCC), International Mobile Equipment Identity (IMEI), International Mobile Subscriber Identity (IMSI), Electronic Serial Number (ESN), battery level of the smart phone etc., this is of value to the remote technician.

RD Mobile application requires access to display, key and touches events from the device. Some of the Device OS' may not provide APIs for these features. Therefore preloaded RD Adapter is required to provide access to the display, key and touch events in a secure and robust manner to the RD Mobile application. The RD Adapter will reside in the device as it is built into the distribution.

The RD Mobile Enabler that will reside along with RD Adapter under system files. The SMS interceptor on the RD Mobile application will be moved under the RD Mobile Enabler. The RD Mobile Enabler performs the key functions:
1. Intercepts all the SMS.
2. Keeps the RD Mobile application to its current version. If the RD Mobile is removed accidentally the RD Mobile Enabler shall connect to the server and download the application and installs the same.

The Session Mediation server and the embedded stub communicate through a secure link via Virtual Mobile Management Client. There are two key processes involved: Secured Privileged Access to the embedded client and Key Exchange Algorithm procedure. The stub is embedded into the mobile device by the device vendor with "root" privilege. The next step is to install the Virtual Mobile Management client and tools on the mobile device. When the Session Mediation Server makes a connection to the device, the Virtual Mobile Management Client does not have the right privilege to invoke any of the installed tools. Hence the stub gets invoked by the client. The stub then elevates the access level of the Tool Stub to make the connection. When the stub receives connection request from the Mediation server for the first time after installation a Key Exchange procedure, mutual authentication is taken place between the stub, Virtual Mobile Management Client and the Session Mediation Server. The Session Mediation server and the embedded stub communicate through a secure link via Virtual Mobile Management Client.

Figure 4:
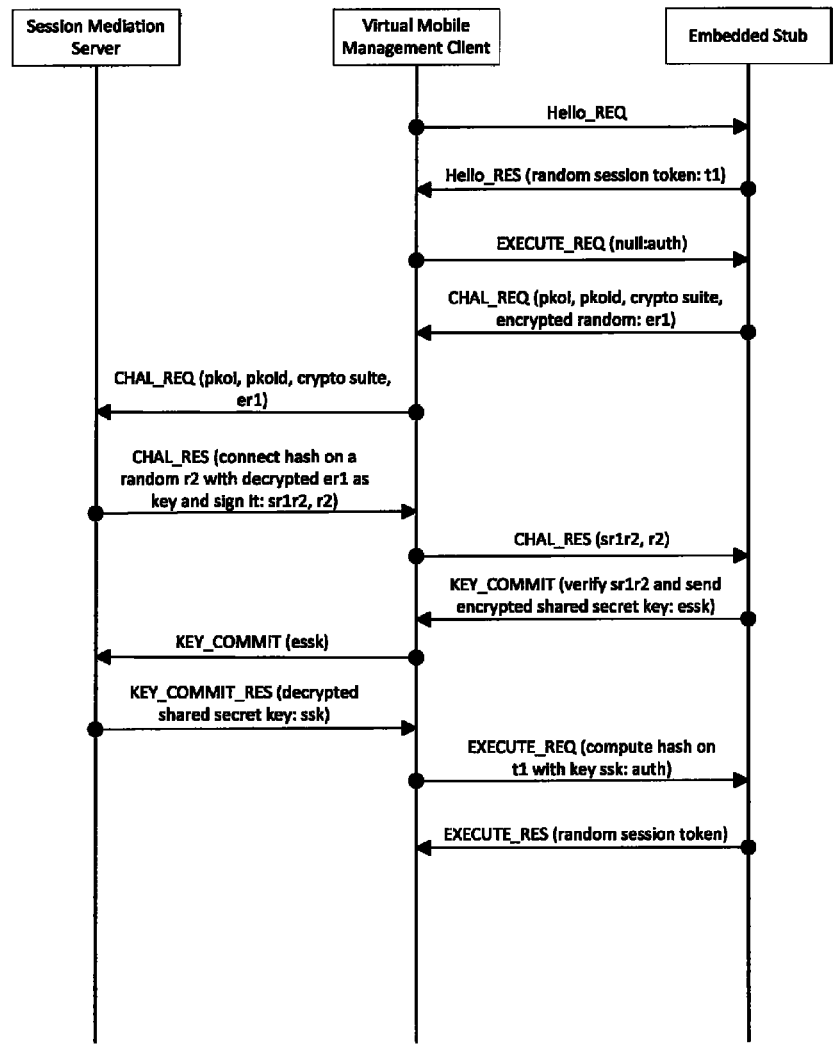
FIG. 4 is flow charge of a key exchange algorithm procedure.

FIG. 4 presents key exchange algorithm process which it describes the security key data flow between the session mediation server and the embedded stub in which it is exemplified by the Remote Control authorization provided by the embedded stub to the VMM client.

Step 1: VMM Client sends a connection request to the embedded stub.

Step 2: Embedded stub sends a random session token to VMM Client.

Step 3: VMM Client sends the NULL authentication vector to indicate the embedded stub that it does not have the session key.

Step 4: Embedded stub sends a challenge request with encrypted random number and the crypto suite that was used to encrypt the random number.

Step 5: VMM Client forwards the message to the Server.

Step 6: Session Mediation Server computes hash on the random value r2 with decrypted er1 as key. The server also creates a signature of r1 and r2 random numbers, and sends the signature to VMM Client.

Step 7: VMM Client forwards the signature to embedded stub.

Step 8: Embedded stub verifies the signature and sends the Shared Secret Key (SSK) which is encrypted.

Step 9: The server decrypts the SSK and sends the response to VMM Client.

Step 10: VMM Client computes hash on token t1 with the SSK and requests the session token from the embedded stub.

Step 11: Now the Embedded stub sends the session token information to the VMM Client and completes the mutual authentication process before the session starts.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method for obtaining secured privileged access in a mobile device, the method comprising:
    configuring the mobile device with an embedded stub having root privileges;
    configuring a client and a plurality of tools on the mobile device;
    attempting to make a connection with a server via the client;
    detecting whether the client has a privilege to invoke at least one tool of the plurality of tools;
    invoking the embedded stub to elevate an access level of the at least one tool to make a connection with the server;
    receiving a stub connection request from the server; and
    performing a mutual authentication between the embedded stub, the client and the server, further comprising:
    sending a connection request from the client to the embedded stub;
    sending a random session token from the stub to the client;
    sending a NULL authentication vector from the client to indicate to the embedded stub that the client does not have the session key;
    sending, by the embedded stub to the server via the client, a challenge request with encrypted random number and cryptographic algorithm that was used to encrypt the random number;
    receiving, at the embedded stub via the client, a signature sent by server;
    verifying, at the stub, the signature and sending via the client a key that is encrypted;
    receiving at the client a response from the server on a condition that the server decrypted the key that was encrypted;
    computing, at the client, a hash on a token with the key and requesting a session token from the embedded stub; and
    sending, by the embedded stub, the session to the client and completing a mutual authentication process.

2. The method according to claim 1, wherein the client connects with the server using the embedded stub.

3. The method according to claim 1, wherein the embedded stub communicates through a secure link via the client.

4. The method of claim 1, wherein the stub supports a secure remote control authentication between the server and the client.

5. A mobile device, comprising:
    Memory for storing an embedded stub having root privileges;
    a client;
    a microprocessor;
    a plurality of tools;
    the client configured to attempt to make a connection with a server;
    the client configured to detect whether privileges exist to invoke at least one tool of the plurality of tools;
    the client configured to invoke the embedded stub to elevate an access level of the at least one tool to make a connection with the server;
    the client configured to receive a stub connection request from the server; and
    the client and embedded stub configured to perform a mutual authentication between the embedded stub, the client and the server, wherein:
    the client sends a connection request to the embedded stub;
    the embedded stub sends a random session token to the client;
    the client sends a NULL authentication vector to indicate to the embedded stub that the client does not have the session key;
    the embedded stub sends to the server via the client a challenge request with encrypted random number and cryptographic algorithm that was used to encrypt the random number;
    the embedded stub receives via the client a signature sent by the server;
    the embedded stub verifies the signature and to send via the client a key that is encrypted;
    the client receives a response from the server on a condition that the server decrypted the key that was encrypted;
    the client computes a hash on a token with the key and requesting a session token from the embedded stub; and
    the embedded stub sends the session to the client and completing a mutual authentication process.

6. The mobile device according to claim 5, wherein the client connects with the server using the embedded stub.

7. The mobile device according to claim 5, wherein the embedded stub is configured to communicate through a secure link via the client.

8. The mobile device according to claim 5, wherein the embedded stub is configured to support a secure remote control authentication between the server and the client.

9. A method for obtaining secured privileged access in a mobile device, the method comprising:
    configuring the mobile device with a remote diagnostic (RD) adapter having root privileges;
    configuring a RD mobile application and a plurality of tools on the mobile device;
    attempting to make a connection with a server via the RD mobile application;
    detecting whether the RD mobile application has a privilege to invoke at least one tool of the plurality of tools;
    invoking the RD adapter to elevate an access level of the at least one tool to make a connection with the server;
    receiving a RD adapter connection request from the server; and
    performing a mutual authentication between the RD adapter, the RD mobile application and the server, further comprising:
    sending a connection request from the RD mobile application to the RD adapter;
    sending a random session token from the RD adapter to the RD mobile application;
    sending a NULL authentication vector from the RD mobile application to indicate to the RD adapter that the RD mobile application does not have the session key;
    sending, by the RD adapter to the server via the RD mobile application, a challenge request with encrypted random number and cryptographic algorithm that was used to encrypt the random number;

receiving, at the RD adapter via the RD mobile application, a signature sent by server;

verifying, at the RD adapter, the signature and sending via the RD mobile application a key that is encrypted;

receiving at the RD mobile application a response from the server on a condition that the server decrypted the key that was encrypted;

computing, at the RD mobile application, a hash on a token with the key and requesting a session token from the RD adapter; and sending, by the RD adapter, the session to the RD mobile application and completing a mutual authentication process.

10. The method according to claim 1, wherein the RD mobile application to connects with the server using the RD adapter.

11. The method according to claim 1, wherein the RD adapter communicates through a secure link via the RD mobile application.

12. The method of claim 1, wherein the RD adapter supports a secure remote control authentication between the server and the RD mobile application.

13. A system, comprising:
a device including a client and a plurality of tools;
an embedded stub having elevated privileges;
the client configured to attempt to make a connection with a server;
the client configured to detect whether privileges exist to invoke at least one tool of the plurality of tools;
the client configured to invoke the embedded stub to elevate an access level of the at least one tool to make a connection with the server;
the client configured to receive a stub connection request from the server; and
the client and embedded stub configured to perform a mutual authentication between the embedded stub, the client and the server, wherein:
the client sends a connection request to the embedded stub;
the embedded stub sends a random session token to the client;
the client sends a NULL authentication vector to indicate to the embedded stub that the client does not have the session key;
the embedded stub sends to the server via the client a challenge request with encrypted random number and cryptographic algorithm that was used to encrypt the random number;
the embedded stub receives via the client a signature sent by the server;
the embedded stub verifies the signature and to send via the client a key that is encrypted;
the client receives a response from the server on a condition that the server decrypted the key that was encrypted;
the client computes a hash on a token with the key and requesting a session token from the embedded stub; and
the embedded stub sends the session to the client and completing a mutual authentication process.

14. The system according to claim 13, wherein client connects with the server using the embedded stub.

15. The system according to claim 13, wherein the embedded stub is configured to communicate through a secure link via the client.

16. The system according to claim 13, wherein the embedded stub is configured to support a secure remote control authentication between the server and the client.

* * * * *

UNITED STATES PATENT AND TRADEMARK OFFICE
CERTIFICATE OF CORRECTION

| | |
|---|---|
| PATENT NO. | : 8,782,412 B2 |
| APPLICATION NO. | : 13/599749 |
| DATED | : July 15, 2014 |
| INVENTOR(S) | : Charles et al. |

It is certified that error appears in the above-identified patent and that said Letters Patent is hereby corrected as shown below:

ON THE TITLE PAGE

Please replace

"(73) Assignee: AstherPal Inc., South Plainfield, NJ (US)"

with

--(73) Assignee: AetherPal Inc., South Plainfield, NJ (US)--.

Signed and Sealed this
Thirtieth Day of September, 2014

Michelle K. Lee
*Deputy Director of the United States Patent and Trademark Office*